Jan. 4, 1938. W. F. CUMMINGS 2,104,362
PIPE ROLLING DEVICE
Filed June 9, 1936 3 Sheets-Sheet 1
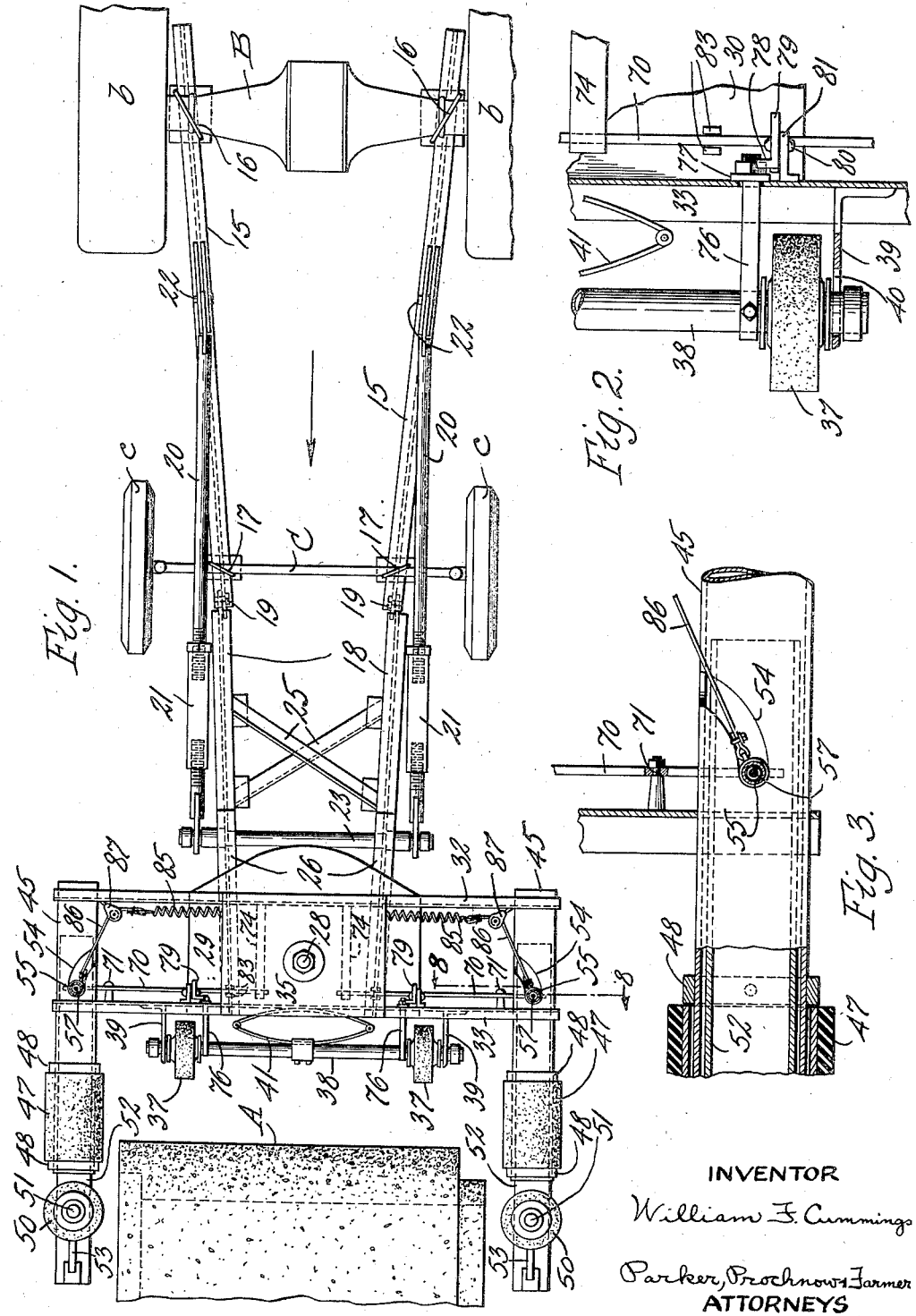
INVENTOR
William F. Cummings
Parker, Prochnow & Farmer
ATTORNEYS Jan. 4, 1938.  W. F. CUMMINGS  2,104,362
PIPE ROLLING DEVICE
Filed June 9, 1936  3 Sheets-Sheet 2
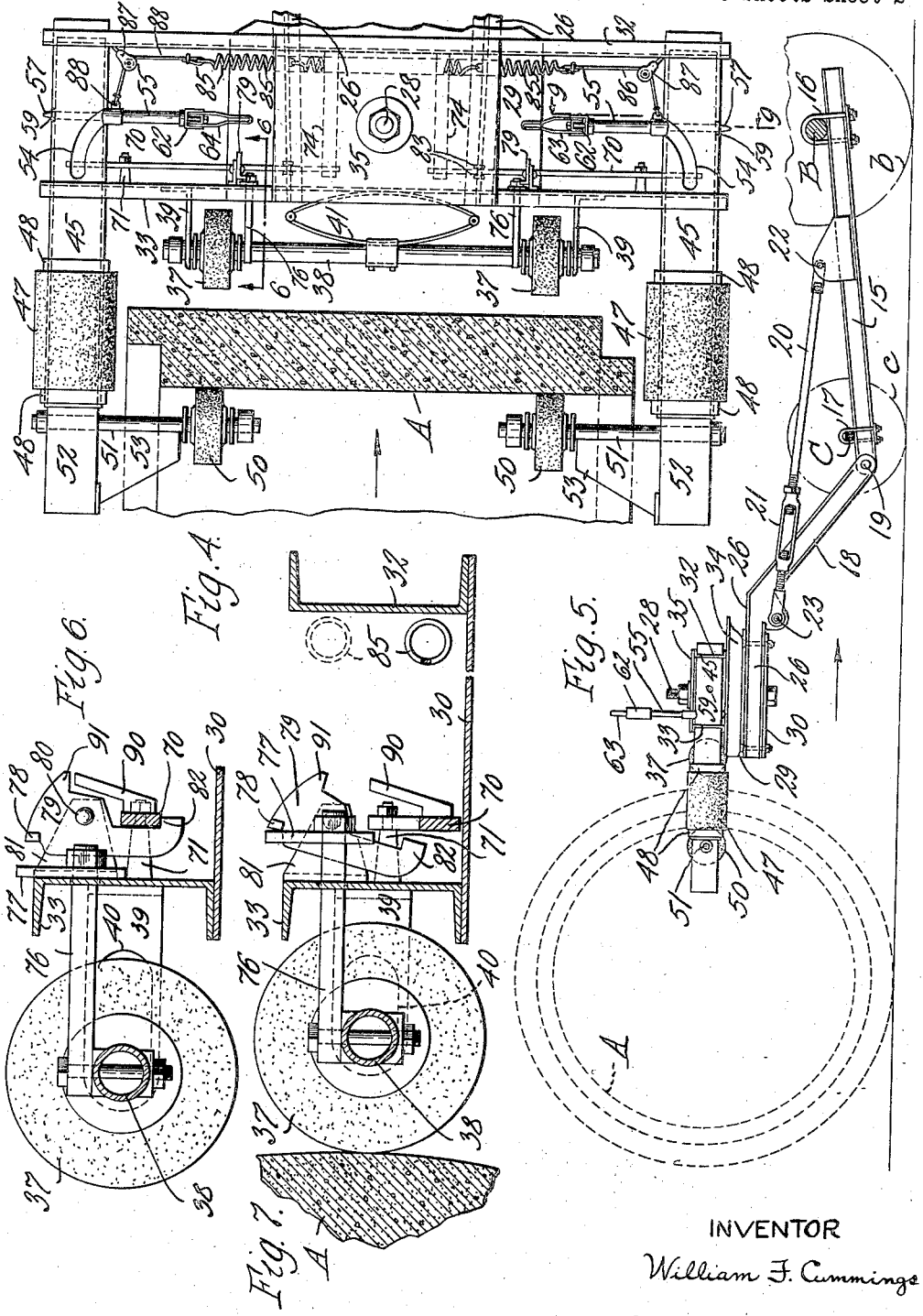
INVENTOR
William F. Cummings
Parker, Prochnow + Farmer
ATTORNEYS Jan. 4, 1938.  W. F. CUMMINGS  2,104,362
PIPE ROLLING DEVICE
Filed June 9, 1936   3 Sheets-Sheet 3
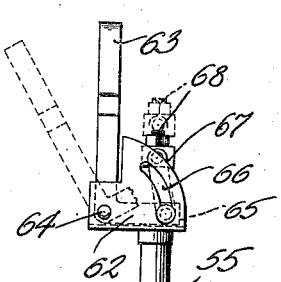
Fig.10.
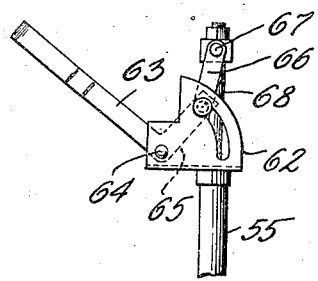
Fig.11.
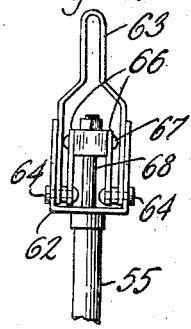
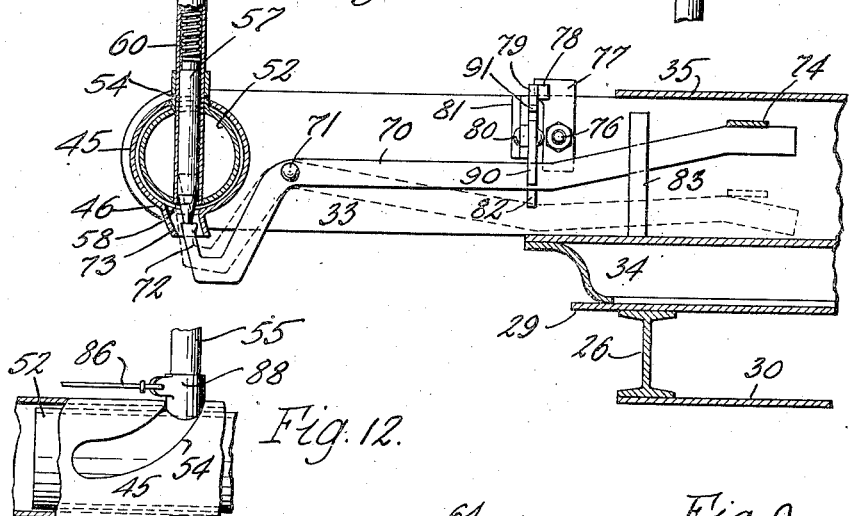
Fig.8.
Fig.12.
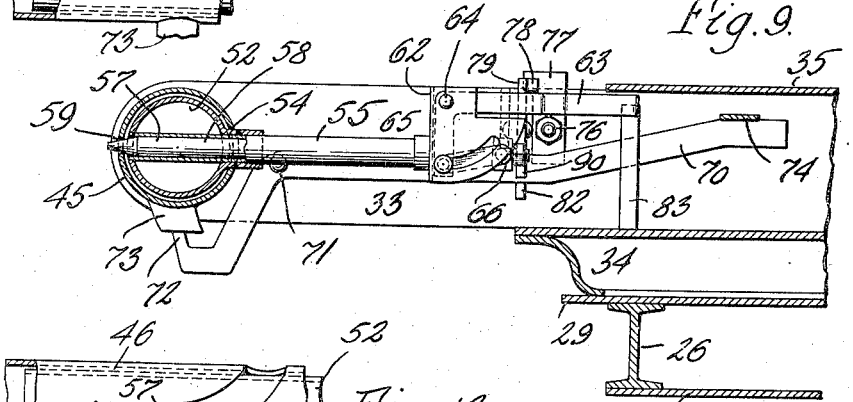
Fig.9.
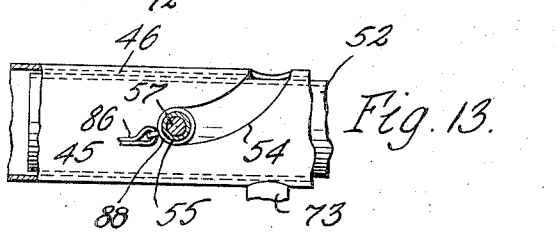
Fig.13.
INVENTOR
William F. Cummings
Parker, Prochnow & Farmer
ATTORNEYS Patented Jan. 4, 1938

2,104,362

UNITED STATES PATENT OFFICE 2,104,362

PIPE ROLLING DEVICE

William F. Cummings, Buffalo, N. Y., assignor to Great Lakes Concrete Pipe Co. Inc., Buffalo, N. Y.

Application June 9, 1936, Serial No. 84,261

21 Claims. (Cl. 214—1)

This invention relates to improvements in devices for rolling or transporting pipes, particularly pipes of large diameters, such, for example, as concrete sewer pipes.

The objects of this invention are to provide a device by means of which a pipe can be easily rolled from one position to another and whereby the danger and labor incident to the moving of heavy pipes is materially reduced. Another object is to provide a device of this kind which can be readily applied to or disconnected from a tractor or other vehicle.

Another object of this invention is to provide a device of this kind with rollers arranged to engage portions of the exterior and interior cylindrical surfaces of a pipe, and in which the rollers engaging the interior surface are arranged to move into and out of their operative positions through the opposite ends of the pipe. Another object is to provide a device of this kind with rollers engaging the ends of the pipes to facilitate the guiding of pipes while the same are being rolled. Another object is to provide rollers for engaging the interior of the pipe, which are movable in a direction lengthwise of the vehicle while moving crosswise into and out of engagement with the pipe, to confine the pipe more closely between the inner and outer rollers of the device.

Another object of this invention is to provide a device of this kind which can be readily connected with or disconnected from a pipe. Another object is to provide a device of this kind in which the rollers engaging in the interior of the pipe may be automatically moved into their operative positions when the other rolls of the device are in correct relation to a pipe.

Still another object is to provide a device which includes a part mounted on a vehicle and a horizontally swinging pipe engaging part connected therewith.

Other objects of this invention will appear from the following description and claims.

In the accompanying drawings:

Fig. 1 is a top plan view, partly in section, of a pipe rolling device embodying this invention, showing the same applied to the front and rear axles of a tractor or other vehicle and showing the same disengaged from a pipe.

Fig. 2 is a fragmentary plan view thereof, partly in section, and on an enlarged scale.

Fig. 3 is a fragmentary top plan view thereof, partly in section.

Fig. 4 is a top plan view thereof showing the pipe in section and showing the parts of the apparatus in their operative positions with relation to the pipe.

Fig. 5 is a side elevation of the device on a smaller scale.

Fig. 6 is a longitudinal sectional elevation thereof on line 6—6, Fig. 4.

Fig. 7 is a similar longitudinal sectional view showing some of the parts in different positions.

Fig. 8 is a transverse sectional elevation on 8—8, Fig. 1.

Fig. 9 is a similar view on line 9—9, Fig. 4, showing the parts in different positions.

Figs. 10 and 11 are respectively front and side views of a part of the mechanism for moving the inner rollers into and out of their operative positions with relation to the pipe.

Figs. 12 and 13 are side views, partly in section, of a side arm of the device and showing some of the parts in different positions.

In the drawings which disclose by way of example one embodiment of my invention, A represents the pipe to be rolled. The device for rolling the same is mounted upon a power driven vehicle of any suitable kind, and since the vehicle itself does not form a part of this invention, the drawings disclose only portions of such vehicle. B represents a rear axle and differential housing of a tractor or other vehicle having rear or driving wheels b, and C represents the front axle of the vehicle having wheels c. The frame, engine and other parts of the vehicle are not shown.

My pipe rolling device includes a part which is rigidly mounted on the vehicle and this part may comprise two beams or frame members 15 suitably secured to the rear axle housing B by means of suitable clamps or connectors 16 and to the front axle by means of similar clamping members 17. In the particular construction shown, my pipe rolling device is mounted to extend forwardly from the front end of the vehicle, but it will be obvious that if desired the device may extend beyond the rear end of the vehicle. Since these four clamps are bolted on the axle and axle housing, it will be apparent that my improved pipe rolling device may be easily mounted on a vehicle and can also be easily disconnected therefrom, so that the vehicle can be used for other purposes.

The part of the frame of my pipe rolling device which is secured to a vehicle preferably includes a part which is vertically adjustable to readily adapt the device to operate on pipes of different diameters. For this purpose, the front ends of the beams or frame members 15 have adjustable bars or structural members 18 pivoted thereto at 19 and extending forwardly and upwardly beyond the front end of the beams or frame members 15. The pivoted frame members 18 may be adjusted in any suitable manner, for example, by means of a pair of adjustable links or tension members 20 provided with turn buckles 21, the rear end of each link being pivoted at 22 on a bracket secured to a frame member or beam 15 and at its front end to a rod or shaft 23 secured on the pivoted frame member 18. By adjusting the turn buckles 21, it will be obvious that the front end of the pivoted frame member 18 may be swung upwardly or downwardly about its pivot 19. The frame members 18 may be held in correct relation to each other by means of braces or cross beams 25.

The outer ends of the adjustable frame members 18 may be constructed in any suitable manner to support the pipe engaging portion of the device. In the particular construction shown for this purpose, the outer ends of the beams 18 have substantially horizontal portions 26 welded or otherwise suitably secured thereon. The pipe engaging mechanism is preferably mounted thereon in such a manner as to pivot about a king pin or substantially vertical bolt 28, and for this purpose, the outer ends of the supporting frame are provided with a pair of plates 29 and 30 extending crosswise and connected to the upper and lower flanges of the beams 26. These plates are provided with suitable holes or bearings through which the king pin or bolt 28 extends. The pipe engaging mechanism may, of course, be rigidly connected to or mounted on the supporting frame therefor, if desired.

The pipe rolling mechanism which is mounted on the upper face of the upper plate 29 may have a roller supporting frame of any suitable or desired construction. That shown in the drawings includes a pair of transverse beams 32 and 33, to the lower faces of which is secured a fifth wheel or flanged bearing member 34, which bears upon the upper face of the plate 29 and to the upper faces of the beams 32 and 33, a plate 35 is secured which has a hole or bearing through which the king pin or bolt 28 extends. In view of this construction, the transverse bars or beams 32 and 33 and the parts of the pipe rolling device mounted thereon may swing about the axis of the king pin or bolt 28.

The pipe rolling device includes a suitable rotatable member which may contact with a cylindrical surface of the pipe to push the same along the ground in one direction, and in the particular construction shown, this rotatable member is in the form of a pair of wheels or rollers 37 mounted to rotate upon a shaft or axle 38, which is supported from the beam 33 by means of brackets 39 arranged near the opposite ends of the axle or shaft 38. These brackets are provided with longitudinally extending slots 40, Fig. 2, so that the shaft 38 may move or yield lengthwise of the device when exerting pressure against a pipe. Under normal conditions the shaft 38 is yieldingly held in its outer position in any suitable manner, for example, by means of an elliptical spring 41 interposed between the shaft 38 and the frame member 33. This spring serves to cushion the effects of impacts of the rollers 37 against a pipe A and the relative movement between the shaft 38 and the frame member 33 may be further utilized, as will be hereinafter explained.

My improved pipe rolling device is also provided with rollers adapted to engage the pipe for rolling the same in the opposite direction from that imparted thereto by the rollers 37, and preferably rollers are also provided for engaging the ends of the pipe to keep the same in correct relation to the inner and outer rollers. In the particular construction shown for this purpose, the opposite ends of the cross beams or bars 32 and 33 have forwardly extending arms 45 rigidly secured thereto and spaced apart so that the arms may be positioned beyond the opposite ends of a pipe. These arms may, for example, be tubular in form and at a suitable distance forwardly from the transverse frame member 33, rollers 47 are provided, which are arranged to engage the ends of the pipe. These rollers are mounted to rotate about the tubular arms 45 and are held in correct positions lengthwise thereof by means of collars or sleeves 48 suitably secured to the arms 45. Any other means for mounting the end rollers on the device may be employed.

Rollers 50 are provided for moving the pipe in a direction opposite to that in which the pipe is moved by the rollers 37. These rollers 50 are movable into inoperative positions beyond the ends of a pipe and into operative positions between the planes of the ends of the pipe. In the particular embodiment of my invention shown in the drawings, these rollers are arranged to move into operative positions within a pipe to engage the inner cylindrical surface thereof by mounting the rollers 50 on the ends of suitable brackets pivoted to swing on the arms 45 in such a manner that the ends of the brackets carrying the rollers 50 may swing into the interior of a pipe, as shown in Fig. 4, or may swing into upright inoperative positions beyond the ends of the pipe, as shown in Fig. 1. These swinging brackets may be of any suitable construction, and as shown in the drawings, see particularly Figs. 1 and 4, the inner rollers 50 are mounted on short shafts or axles 51 which in turn are secured to cylindrical or pivot members 52 telescoping into the tubular arms or members 45. Suitable reinforcing plates 53 are preferably employed and are suitably welded or otherwise secured to the axles 51 and the pivot members 52. Other means for movably mounting the rollers 50 on the pipe rolling device may be employed.

Preferably the pivot members 52 of the swinging brackets may move to a limited extent lengthwise relatively to the arms 45, in addition to their swinging movement. In order to produce movement of this kind, the outer tubular members 45 are preferably provided with slots 54 through which suitable shifting rods or arms 55 extend, the inner ends of these arms being rigidly secured to the inner cylindrical or pivot members 52. When these arms are swung into their upper positions as shown in Fig. 1, the inner rollers 50 will be in their inoperative positions and because of the inclinations of the slots 54, the cylindrical bearing supports for the inner rollers will also be in their outermost positions with reference to the tubular members 45 into which they extend. When, on the other hand, the arms 55 are swung inwardly toward each other into the positions shown in Fig. 4, the inner rollers 50 will swing into positions into which their axes are substantially horizontal and the cylindrical pivot members 52 thereof will be moved inwardly with reference to the arms 45. This longitudinal movement of the cylindrical pivot members 52 is very desirable for the reason that this movement enables the inner rollers 50 when in operative positions, to be sufficiently close to the outer rollers 37 so that there will be comparatively little play between the inner and outer rollers within which the pipe A can move lengthwise of the rolling device. Because of the curvature of the pipe, it would be impossible with pipes of smaller diameters to move the inner rollers 50 as closely to the outer rollers 37 without such longitudinal movement.

Suitable means are preferably provided to hold the inner rollers 50 positively either in their operative or inoperative positions. For example, the rods 55 secured to the cylindrical supporting members 52 for the inner rollers may be made hollow or of tubular form and provided with locking plungers 57 therein. The rods and plungers preferably extend diametrically through the inner cylindrical or tubular members 52 and the the outer tubular members 45 are preferably provided with suitable holes or apertures 58 and 59 located diametrically opposite the ends of the slots 54 and into which the locking pins 57 will enter when the inner rollers 50 are in their inoperative and operative positions respectively. Each locking bolt or plunger 57 may be yieldingly urged into its locking position by means of a spring 60, and may be withdrawn from locking position against the action of the spring 60 in any suitable or desired manner. In the construction illustrated, each of the tubular shifting arms 55 is provided at its upper end with a bracket 62 on which a hand lever 63 is pivoted at 64. This hand lever 63, as clearly shown in Figs. 10 and 11, is of a bifurcated shape and the ends thereof are provided with short arms 65 pivotally connected to links 66, the upper ends of which are pivotally connected at 67 to a rod or link 68, which may be a part of or secured to the locking plunger 57. Consequently, it will be obvious that when the lever 63 is pushed into the position shown in Fig. 10, the rod 68 will be drawn outwardly with reference to the shifting arm 55 against the action of the spring 60 and will, consequently, withdraw the retaining rod or pin 57 out of either of the holes 58 or 59 in the outer tube 45. Any other means for releasably locking the inner rollers in either their operative or inoperative position may be provided.

In the simplest form of my pipe rolling device, the shifting rods 55 may be moved by hand into either of their two positions at the ends of the slots 54. When the device is constructed in this manner, it will be obvious that if the tractor or vehicle on which it is mounted is moved toward the pipe A in the direction of the arrow in Fig. 1, the shifting rods 55 may be swung inwardly and rearwardly in the slots 54 to place the inner rollers 50 into their operative positions. Consequently, the pipe is connected with the vehicle in such a manner that when the vehicle is moved forwardly, the pipe will be rolled because of contact with the outside rollers 37. When the vehicle is moved in the reverse direction, the inner rollers 50 engage the inner cylindrical surface of the pipe and cause the pipe to be rolled in the opposite direction. When the vehicle is turned, the edges of the pipes may contact with one or other of the side rollers 47, so that the pipe will be maintained in correct relation to the inner and outer rollers 37 and 50. When the pipe has been rolled to the desired position or location, the shifting rods 55 are swung from their inner positions shown in Fig. 4 to their upright positions shown in Fig. 1, so that by backing the vehicle, it will become entirely disengaged from the pipe. During the rolling of the pipes, the pipe engaging mechanism may, of course, swing about the axis of the vertical king pin or bolt 28, thus relieving the frame member of strains which would otherwise result. When the device is intended to be used on pipes of materially different diameters, the turn buckles 21 may be adjusted, so that the axes of the several rollers will be approximately in the same horizontal plane as the axes of the pipes to be rolled. It is not, however, necessary to employ any accuracy in the vertical positioning of the pipe engaging part of the device, since the device will roll pipes in a satisfactory manner, even if the rollers 37 and 50 are considerably above or below the level of the axis of the pipe.

It will also be noted that preferably the rollers 37, 47, and 50 are covered with rubber, since it has been found that the rubber surfaces are much more resistant to wear due to contact with the pipes, and in the second place, the rubber surfaces of the rollers act as cushions to prevent damage to the mechanism by shocks caused by blows resulting from the contacting of the pipe with the rollers. Such damage is particularly apt to result when the pipes are being rolled over rough surfaces.

The pipe rolling device described may also be provided with means for automatically coupling the same to a pipe, by moving the inner rollers 50 into the interior of the pipe when the device is in operative relation thereto. In the particular construction illustrated, this is accomplished by means of the relative movement of the shaft 38 of the rollers 37 to the frame member 33 so that when the device is moved against a pipe in such a manner that the rollers 37 engage against the outer surface of the same, suitable mechanism will be actuated to cause the inner rollers 50 to move from their upright positions shown in Fig. 1, to their horizontal or operative positions shown in Fig. 4.

In order to automatically move the inner rollers from their inoperative into their operative positions, it is, of course, necessary, in the first place, to disengage the locking plunger or bolt 57 from its locking position. This may be accomplished in any suitable or desired manner, and in the particular construction illustrated for this purpose, a locking bolt disengaging lever 70 is provided for each plunger or bolt 57, which is pivoted at 71 on the rear face of the transverse beam 33. One end of this lever is hooked and provided at its end with a projection 72 which extends into and is movable in an annular guide sleeve or collar 73 extending about the aperture 58 in the outer tube or arm 45. The lever 70 has a long arm against which a leaf spring 74 presses in a direction to normally urge the lever 70 into a position in which the locking pin or plunger 57 is moved out of its locking position in the hole 58. The lever 70, however, is releasably held against unlocking movement by a suitable detent mechanism which in the construction shown is released only when the axle or shaft 38 is moved rearwardly with reference to the cross beam 33. This detent mechanism is clearly shown in Figs. 6 and 7 and includes a rod 76 secured to the axle or shaft 38 and extending through a hole or aperture in the cross beam 33. The rod 76 has a transverse plate 77 secured thereto which normally lies in contact with the rear face of the transverse beam 33. The two slidable rods 76 and the plates 77 of the two releasing mechanisms for the inner rollers, also serve to limit the extent to which the shaft 38 is pressed outwardly by means of the spring 41.

When due to pressure exerted on the rollers 37 by a pipe, the axle 38 is moved toward the cross beam 33, each rod 36 will move rearwardly carrying with it the plate 77 which is arranged to engage with a finger or projection 78 formed on a ratchet or detent member 79, pivoted at 80 on a bracket 81 extending rearwardly from the cross beam 33. This detent member has at its lower end a ledge or hook portion 82 upon which the lever 70 normally rests. When the detent member 79 is swung from the position shown in Fig. 6, into that shown in Fig. 7, the lever retaining hook 82 moves out of engagement with the lever 70 and permits the spring 74 to swing this lever about its pivot 71, so that the hooked end 72 will move upwardly in the guide sleeve surrounding the aperture 58 sufficiently to move the retaining pin or plunger 57 out of the aperture 58, so that the shifting rod 55, the cylindrical supporting member 52 and the inner roller 50 connected therewith are free to move into their operative positions. 83 represents a pair of parallel upright guide rods which may be used to guide the lever in its movement in correct relation to the detent member.

The inner rollers and parts associated therewith may be moved into operative positions in any suitable manner, after release of the retaining or locking pin 57, and in the particular construction illustrated by way of example, a spring 85 is employed for each of the arms 55. The two springs 85 may be arranged one above the other in overlapping relation to provide for ample length of the springs, and one end of each spring is suitably secured to any convenient fixed part or member, such for example as the rear cross beam 32. The other end of each spring is connected to a wire or cord 86 guided through a pulley 87 and having the end thereof secured to a collar 88 suitably secured to the tubular shifting arm 55 adjacent to the slot 54. The springs, consequently, continually exert a pull against the arms 55 in a direction to move the same from the positions shown in Fig. 1 to those shown in Fig. 4. Consequently, when the holding pin or plunger 57 is disengaged from the hole 58 by engagement of the outer rollers 37 with the outer surface of a pipe as has been described, the springs 85 will pull the arms 55 lengthwise of the guide slots 54 in such a manner as to swing the inner rollers 50 from their upright or inoperative positions into the interior of the pipe. When the inner rollers 50 reach positions in which their axes are substantially horizontal, the arms 55 will also be in horizontal positions, so that the locking pins or bolts 57 will engage in the holes 59 in the tubular members 45. The inner rollers will then be locked in their operative positions as shown in Fig. 4.

When it is then desired to release the device from a pipe, the levers 70 are also manually restored to their positions indicated in full lines in Fig. 8 by swinging the levers against the actions of the springs 74 into positions in which they are again held to the detent members 79. The arms 55 are then actuated manually by swinging the bifurcated levers 63 about their pivots as described to unlock the bolts 57 from the apertures 59. The shifting arms 55 and the inner rollers 50 associated therewith can then be swung into upright or pipe releasing positions, whereupon the automatic pipe engaging mechanism is ready to again operate when moved into engagement with another pipe.

In order to facilitate the engagement of the detent members 79 with the levers 70, each lever is preferably provided with an upwardly extending finger or projection 90, see Figs. 6 and 7, which is arranged to engage with a projection 91 on the detent member 79 to swing this member into holding position when the lever 70 is moved into operative relation thereto.

The pipe rolling device described is so constructed as to greatly facilitate the rolling of pipes by means of a tractor, truck or other power driven vehicle. In the first place, by pivoting the pipe engaging device relative to the frame which is attached to the vehicle about an upright pivot, the pipe engaging device can be very easily moved into engagement with the pipe, and when the pipe is being rolled, the upright pivot or king pin greatly facilitates the guiding of the pipe around curves or the like. The end rollers of the device also improve the operation of the same in that they help to guide the pipe without excessive friction or wear on the pipe rolling device. By means of the automatic movement of the inner rollers into their operative positions when the outer rollers engage the pipe, considerable labor is saved, since the operator of the truck or tractor may connect the rolling device with the pipe without getting out of his driving position.

I claim as my invention:

1. A device for rolling a pipe, including a roller arranged to engage a cylindrical surface of a pipe for rolling the pipe in one direction, a roller for engaging said pipe for rolling the same in the opposite direction, and a support for said last mentioned roller movably mounted on said device to move into a position to place said roller into operative relation to engage said pipe and into an inoperative position in which said roller is supported beyond an end of said pipe.

2. A device for rolling a pipe including a roller arranged to engage the outer cylindrical surface of a pipe, a roller for engaging the inner cylindrical surface of a pipe, and a movable bracket mounted on said device and on which said last mentioned roller is mounted and which bracket is movable to place said roller into an operative position within a pipe and into an inoperative position beyond an end of said pipe.

3. A device for rolling a pipe including a roller arranged to engage the inner cylindrical surface of a pipe, and a bracket pivoted on said device and on which said roller is mounted, said bracket being movable about its pivot into an operative position in which said roller is arranged within said pipe and into an inoperative position in which said roller is arranged beyond one end of said pipe.

4. A device for rolling a pipe, including a roller arranged to engage a cylindrical surface of a pipe for rolling the pipe in one direction, a pair of arms spaced to extend beyond the opposite ends of a pipe, each of said arms having a roller mounted thereon to move into a position between the planes of the ends of the pipe to engage said pipe in the interior thereof for moving the same in the opposite direction, and into an inoperative position beyond the planes of the ends of said pipe.

5. A device for rolling a pipe, including a roller arranged to engage a cylindrical surface of a pipe for rolling the pipe in one direction, a pair of arms spaced to extend beyond the opposite ends of a pipe, a roller arranged at the end of each arm, said rollers being supported on said arms to extend short distances into the interior of said pipe from opposite ends thereof to engage the pipe to roll the same, said rollers being removable from their operative positions.

6. A pipe rolling device including a frame having a roller mounted thereon for engaging a cylindrical surface of a pipe for rolling said pipe in one direction, a tubular member arranged beyond an end of said roller and adapted to extend beyond an end of a pipe, another roller arranged to engage a cylindrical surface of the pipe for rolling said pipe in the opposite direction, a bracket on which said roller is mounted and including a cylindrical member arranged in telescopic relation to said tubular member, whereby said bracket can swing about a longitudinal axis into a position to move said last mentioned roller into operative relation to a pipe intermediate of the ends thereof and into an inoperative position beyond said end of the pipe.

7. A pipe rolling device including a frame, a roller mounted on said frame for engaging the exterior cylindrical surface of a pipe, a pair of tubular members arranged to extend beyond the opposite ends of the pipe, tubular members in telescopic arrangement with reference to said first mentioned tubular members and extending beyond the ends of the same, and rollers mounted on the ends of said last mentioned tubular members and adapted to be swung into and out of operative relation to the pipe by movement of said last mentioned tubular members about their axes.

8. A pipe rolling device including a frame, a roller mounted on said frame for engaging the exterior cylindrical surface of a pipe, a pair of tubular members arranged to extend beyond the opposite ends of the pipe, tubular members in telescopic arrangement with reference to said first mentioned tubular members and extending beyond the ends of the same, rollers mounted on the ends of said last mentioned tubular members and adapted to be swung into and out of operative relation to the pipe by movement of said last mentioned tubular members about their axes, and means for moving said last mentioned tubular members lengthwise of said first mentioned tubular members.

9. A pipe rolling device including a frame, a roller mounted on said frame for engaging the exterior cylindrical surface of a pipe, a pair of tubular members arranged to extend beyond the opposite ends of the pipe, tubular members in telescopic arrangement with reference to said first mentioned tubular members and extending beyond the ends of the same, rollers mounted on the ends of said last mentioned tubular members and adapted to be swung into and out of operative relation to the pipe by movement of said last mentioned tubular members about their axes, means for moving said last mentioned tubular members lengthwise of said first mentioned tubular members, and rollers mounted to rotate about said first mentioned tubular members for engaging the ends of the pipe.

10. A pipe rolling device including a transverse frame member having arms movable into operative positions beyond the opposite ends of a pipe, rollers arranged at the ends of said arms and adapted to move into the interior of said pipe, brackets on which said rollers are journalled, pivotal connections between said brackets and said arms by means of which said rollers may move into and out of their operative positions within the pipe, and means for moving said pivotal connections in the direction of their axes lengthwise of said arms while said brackets are swinging about said axes, to cause said rollers to move toward the inner periphery of said pipe while swinging into said pipe.

11. A pipe rolling device including a roller adapted to engage the exterior cylindrical surface of a pipe, arms arranged at opposite ends of said roller and between which a pipe may enter, rollers arranged at the ends of said arms and movable on and relatively to said arms toward each other into operative positions in the interior of a pipe and away from each other into inoperative positions beyond the ends of said pipe.

12. A pipe rolling device including a roller adapted to engage the exterior cylindrical surface of a pipe, arms arranged at opposite ends of said roller and between which a pipe may enter, rollers arranged at the ends of said arms and movable toward each other into operative positions in the interior of a pipe and away from each other into inoperative positions beyond the ends of said pipe, and means operated by the engagement of said first mentioned roller with the exterior of a pipe, for moving said rollers at the ends of said arms into their operative positions.

13. A pipe rolling device including a frame, a roller yieldingly mounted on said frame in a position to engage the exterior cylindrical surface of a pipe and to move toward said frame when pressed against a pipe, arms mounted on said frame and extending into a position to receive a pipe between them, rollers arranged at the ends of said arms and movable into and out of operative relation to a pipe, and means actuated by the movement of said first mentioned roller toward said frame for moving said last mentioned rollers into operative relation to said pipe.

14. A pipe rolling device including a frame, a roller yieldingly mounted on said frame in a position to engage the exterior cylindrical surface of a pipe and to move toward said frame when pressed against a pipe, arms mounted on said frame and extending into a position to receive a pipe between them, rollers arranged at the ends of said arms and movable into and out of operative positions within a pipe, yielding means for normally urging said inner rollers to swing into their operative positions within the pipe, detent means for holding said inner rollers against swinging into their operative positions, and means actuated by the movement of said first mentioned roller relatively to said frame member for releasing said detent.

15. A pipe rolling device including a frame, a roller mounted on said frame and adapted to engage a pipe to roll the same in one direction, arms mounted on said frame and spaced apart to receive a pipe between them, rollers mounted on the ends of said arms and movable into and out of operative positions relatively to said pipe to roll the same in the opposite direction, means for yieldingly urging said last mentioned rollers into their operative positions, releasable detent means for holding said last mentioned rollers in inoperative positions, and means for releasing said detent means.

16. A pipe rolling device including a frame, a roller mounted thereon for engaging the exterior cylindrical surface of a pipe, a tubular member arranged to extend beyond an end of said pipe, a second tubular member telescoping within and extending beyond an end of said first tubular member, a roller mounted at the exposed end of said second tubular member for movement to and from an inoperative position beyond said end of said pipe into and out of an operative position within said pipe by rotative axial movement of said second tubular member, a locking bolt operable to lock said tubular members together to retain said last roller in its inoperative position, means interposed between said bolt and said first roller and operable by the engagement of said roller with said pipe to release said bolt, means for then automatically turning said second tubular member to place said second roller in operative relation to said pipe, means for automatically actuating said bolt to lock said members in that position, and manually operable means for releasing said bolt and returning said second roller to its inoperative position.

17. A pipe rolling device including a frame, a roller mounted thereon for engaging the exterior cylindrical surface of a pipe, a tubular member arranged to extend beyond an end of said pipe, a second tubular member telescoping within and extending beyond an end of said first tubular member, a roller mounted at the exposed end of said second tubular member for movement to and from an inoperative position beyond said end of said pipe into and out of an operative position within said pipe by rotative axial movement of said second tubular member, a guide on said second tubular member, a spring pressed locking bolt mounted for endwise movement therein and which is engageable in a hole in said first tubular member to lock said second tubular member in position to hold said roller thereon in inoperative relation to said pipe, and manually operable means mounted on said guide and operable to withdraw said bolt from said hole against the action of its spring, and said first tubular member having a second hole into which said released locking bolt may be engaged by turning said second tubular member axially in said first tubular member and releasing said bolt to thereby position and hold said last mentioned roller in operative relation within said pipe.

18. A pipe rolling device including a frame, a roller mounted thereon for engaging the exterior cylindrical surface of a pipe, a tubular member arranged to extend beyond an end of said pipe, a second tubular member telescoping within and extending beyond an end of said first tubular member, a roller mounted at the exposed end of said second tubular member for movement to and from an inoperative position beyond said end of said pipe into and out of an operative position within said pipe by rotative axial movement of said second tubular member, a locking bolt operable to lock said tubular members together to retain said last roller in its inoperative position, a pivoted lever, resilient means engaging therewith and acting to urge a part thereof into engagement with said locking bolt to shift it out of said locking position, a detent engaging said lever and holding the same out of engagement with said bolt against the action of said resilient means, a part associated with said first roller, and which when the latter is engaged with said pipe is operable to shift said detent and release said lever therefrom, whereupon said lever is swung about its pivot under the action of said resilient means and disengages said locking bolt from said first tubular member, and means which then automatically acts upon and turns said second tubular member axially to move said second roller to operative position within said pipe.

19. A pipe rolling device including a frame, a roller mounted on said frame for engaging the exterior cylindrical surface of a pipe, a pair of tubular members arranged to extend beyond the opposite ends of the pipe, tubular members in telescopic arrangement with reference to said first mentioned tubular members and extending beyond the ends of the same, rollers mounted on the ends of said last mentioned tubular members and a manually operable lever connected to each of said last mentioned tubular members for turning said members about their axes relatively to said first tubular members, whereby said rollers may be swung into and out of operative relation to said pipe.

20. A pipe rolling device including a frame having a roller thereon for engaging the exterior cylindrical surface of a pipe, a tubular member arranged to extend beyond an end of the pipe, a cylindrical member arranged in telescopic relation to said tubular member, a roller carried thereon and which is movable from an inoperative position at said end of said pipe to an operative position within the pipe by a turning movement of said cylindrical member relative to said tubular member, and means for locking said members together in either position in which said last named roller is placed by turning said cylindrical member.

21. A pipe rolling device including a frame, a roller mounted on said frame for engaging the exterior cylindrical surface of a pipe, a pair of tubular members arranged to extend beyond the opposite ends of the pipe, tubular members in telescopic arrangement with reference to said first mentioned tubular members and extending beyond the ends of the same, rollers mounted on the ends of said last mentioned tubular members, means connected to each of said last mentioned tubular members for turning said members about their axes relatively to said first tubular members, whereby said rollers may be moved into and out of operative relation to said pipe, and said first tubular members each having a spiral slot through which said turning means extends, whereby said means, when actuated, are caused to follow said slots and effect said turning movement of said second tubular members combined with a lengthwise movement of said members relative to said first tubular members.

WILLIAM F. CUMMINGS.